Dec. 11, 1928.
J. W. ANDERSON
INDICATING APPARATUS
Filed May 29, 1926   2 Sheets-Sheet 1
1,694,903
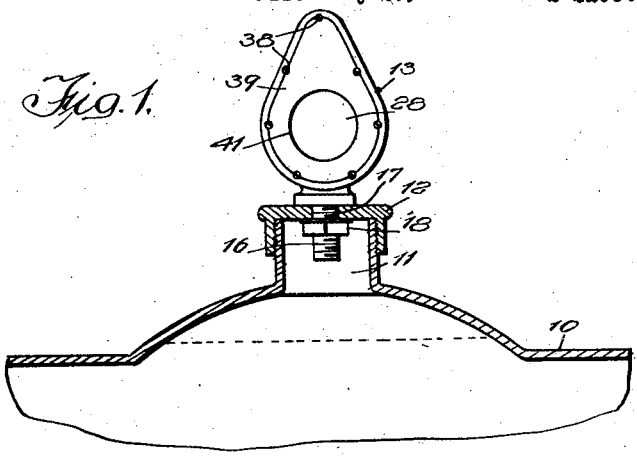
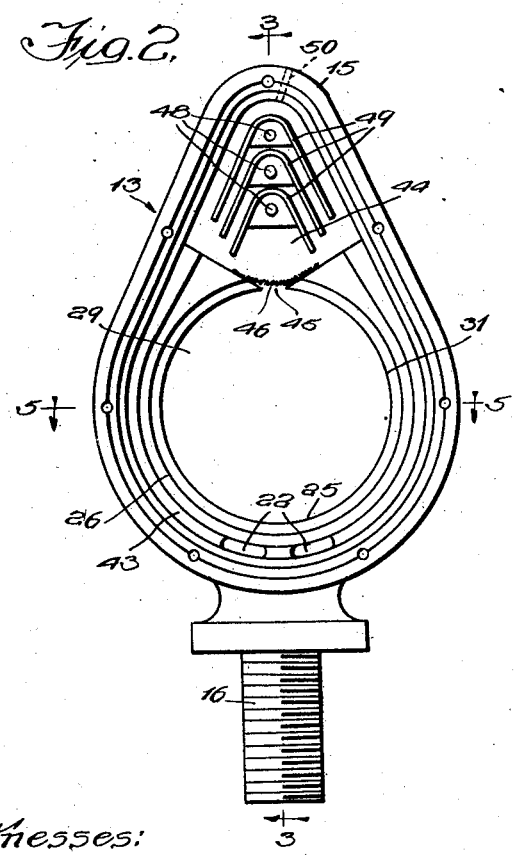
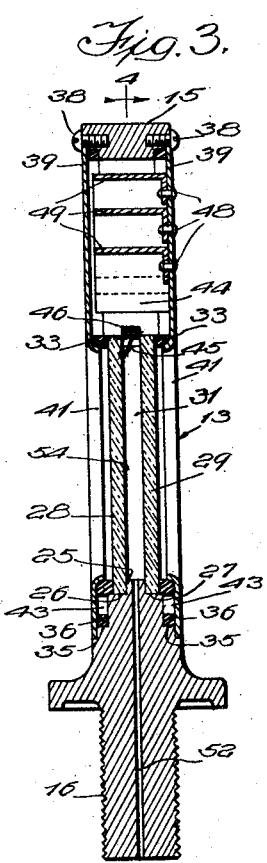
Witnesses:
William P. Kilroy
Harry R. L. White
Inventor:
John W. Anderson
Hill & Hill
Attys Dec. 11, 1928.
J. W. ANDERSON
1,694,903
INDICATING APPARATUS
Filed May 29, 1926   2 Sheets-Sheet 2
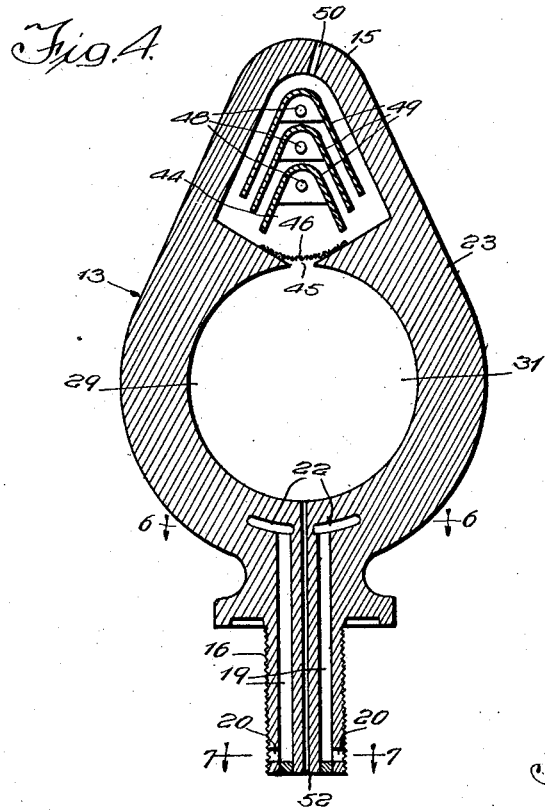
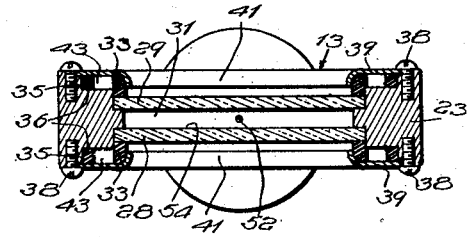
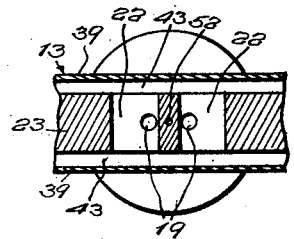
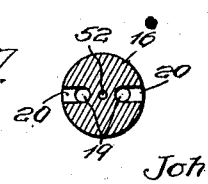
Witnesses:
William P. Kilroy
Harry R. L. White
Inventor:
John W. Anderson
By Hill & Hill
Attys Patented Dec. 11, 1928.

1,694,903

UNITED STATES PATENT OFFICE.

JOHN W. ANDERSON, OF GARY, INDIANA.

INDICATING APPARATUS.

Application filed May 29, 1926. Serial No. 112,712.

My invention relates to indicating devices and more particularly to indicating devices wherein levels which a liquid assumes are calibrated to indicate various conditions.

A particular object of the invention is to provide an improved device for indicating the thermal conditions obtaining in an automobile radiator, a boiler or any other apparatus wherein a liquid is subjected to heat.

Another particular object of the invention is to provide an improved device for indicating the thermal conditions under which an internal combustion engine is operating without employing a temperature-responsive element.

One form of the invention is embodied in an instrument adapted to be mounted upon the filling cap of an automobile radiator and comprises means for condensing vapors rising from the cooling liquid, the liquid so condensed being delivered to a relatively large chamber from which it returns slowly to the cooling system. The amount of liquid which collects in the relatively large chamber indicates the thermal conditions under which the internal combustion engine of the automobile is operating, the chamber being preferably provided with improved glass panels of the type shown and described in my co-pending application, Serial No. 112,714 filed May 29, 1926.

Many other objects and advantages of the construction herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts:

Fig. 1 is a front elevation of an indicating device embodying the invention, the improved device being shown in connection with an automobile radiator;

Fig. 2 is an enlarged elevation of the improved device shown in Fig. 1, one of the cover plates having been removed from the device to disclose certain features of construction;

Fig. 3 is a section taken on line 3—3 of Fig. 2;

Fig. 4 is a section taken on line 4—4 of Fig. 3;

Fig. 5 is a section taken on line 5—5 of Fig. 2;

Fig. 6 is a section taken on line 6—6 of Fig. 4; and

Fig. 7 is a section taken on line 7—7 of Fig. 4

The improved device illustrated in the drawings is particularly adapted to be used in connection with an automobile radiator to indicate the thermal conditions under which the engine of the automobile is operating, but it will become apparent as this description progresses that the invention may be embodied in devices for indicating thermal conditions obtaining within other apparatus. Hence, my invention is limited to use with an automobile radiator only to the extent indicated in the appended claims.

Referring to the drawings and particularly to Fig. 1 for the present, I have shown a portion of a radiator 10 of the type commonly provided in automobiles which are driven by comprising internal combustion engines, the radiator 10 being provided with the usual footing opening 11 which is normally closed by a cap 12. Mounted upon the cap 12 is an indicating device 13 embodying a preferred form of the invention.

The indicating device 13 preferably comprises a housing member 15, which, in this instance, is formed with a screw-threaded stem 16 arranged to project through an aperture 17 formed in the cap 12, a nut 18 being provided to secure the housing member to the cap. As best shown in Fig. 4, the stem 16 is preferably provided with a plurality of upwardly extending passages 19 which communicate with the interior of the radiator 10 through ports 20 and terminate at their upper ends in shorter passages 22. The passages 22 are formed in a substantially pear-shaped portion 23 forming part of the housing member 15, the portion 23 being disposed above the radiator cap 12.

Referring now to Figs. 2, 3 and 5, it will be noted that the housing member 15 is provided with a substantially central aperture 25 and with two annular grooves 26 and 27 in which glass discs 28 and 29, respectively, are seated, the glass discs 28 and 29 being so arranged that they form a relatively large chamber of the aperture 25, which chamber is designated by the reference character 31. Seated upon the outer marginal surface of the glass discs 28 and 29 are packing rings 33, which are preferably formed from resilient material. And seated in substantially pear-shaped grooves 35 formed in the housing member 15 are packing rings 36 which are also preferably formed from resilient material. Secured to each side of the housing member 15 by screws 38, or the equivalent, are cover plates 39 which seat against the packing rings 33 and 36 and preferably compress them to some extent. The cover plates 39 are provided with substantially central apertures 41 aligned with the aforementioned aperture 25 provided in the housing member.

It will be noted that the cover plates 39 cooperate with the packing rings 33 and 36 and the housing member 15 to form arcuate passages 43 which communicate with the aforementioned relatively short passages 22 and communicate, at their upper ends, with a chamber 44 formed between the cover plates 39 and above the chamber 31. The chamber 44 communicates with the chamber 31 through an opening 45 formed in the housing member 15 (see Figs. 2 and 3), a screen being preferably provided at this point, as indicated at 46. Secured to one of the cover plates 39 by rivets 48 or the equivalent are a plurality of baffles 49 which are preferably U-shaped and are arranged in such manner that moisture dripping therefrom will pass through the opening 46 into the chamber 31. In some instances I prefer to provide a relatively small vent opening 50 in the housing member 15, but I do not limit myself to this construction. The chamber 31 preferably communicates directly with the interior of the radiator 10 through a relatively small bore 52 formed in the stem 16. The purpose of this construction will presently appear.

In the preferred embodiment of the invention the glass 28, which is the glass nearest to the driver's seat, is provided with a ground, sand-blasted or roughened surface 54 facing the glass disc 29. And the glass disc 29 is preferably of a different color than the glass disc 28. This feature is more fully described in my aforementioned copending application. Briefly, when the chamber 31 is empty, the glass 28 appears substantially translucent to the driver of the automobile and the color of the glass 29 is not visible therethrough. But if liquid is introduced into the chamber 31, that portion of the glass 28 contacted by the liquid will appear substantially transparent and the color of the glass disc 29 will become apparent therethrough. Obviously, the height of the liquid will be clearly indicated upon the glass 28.

The operation of the above described apparatus is substantially as follows: Assuming that there is no liquid in the indicating device 13 and that the automobile upon which it is mounted is set in operation, it is readily understood that after the automobile has been in operation for some time vapor from the cooling liquid will flow up into the chamber 44 by way of the passages 19, 22 and 43. This vapor condenses upon the walls of the chamber and upon the baffles 49 and the moisture so obtained drips into the chamber 44 through the opening 45, the screen 46 functioning to prevent dirt and the like from entering the chamber 31. The walls of the chamber 44 and the baffles 49 remain relatively cool at all times and particularly so when the automobile is in motion. This insures that vapor in the indicating device 13 will immediately condense. Of course, a portion of the liquid will return to the cooling system through the bore 52 provided in the stem 16, but the bore is preferably of such size that some liquid will collect within the chamber 31 and indicate to the driver the thermal conditions of the cooling system. The indicating device 13 may be designed and calibrated in any desired manner and in some instances I may prefer to so proportion the bore 52 to the remaining parts of the device that when the internal combustion engine is operating under desirable thermal conditions liquid will collect in the chamber 31 until it is substantially half filled. Then, if the temperature of the cooling liquid rises, an additional amount of liquid will collect in the chamber 31 and indicate to the driver that some condition under which the engine is operating must be corrected. If no liquid appears in the chamber 31 it is obvious that too much heat is being withdrawn from the engine by the cooling liquid and the engine is not operating efficiently. An advantage of my improved construction is that the vapor rising from the cooling liquid is condensed and returned thereto so that there is comparatively little waste.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A device for indicating the thermal conditions in a receptacle holding liquid, said device comprising a chamber for accumulating the condensate of vapor rising from said liquid, and means through which the amount of accumulated condensate in said chamber may be observed, said device having a restricted outlet whereby said chamber may drain into said receptacle.

2. A device for indicating the thermal conditions in an automobile radiator comprising a housing member adapted to be mounted upon the radiator, said housing having a chamber, a passage communicating with the radiator and with the chamber, a glass through which the contents of said chamber may be observed, and restricted means for draining the entire contents of said chamber into said radiator.

3. A device for indicating the thermal conditions in a receptacle holding liquid, said device comprising a chamber positioned outside of the receptacle, a relatively large passage extending from the receptacle and arranged to discharge fluid into said chamber from above, transparent means through which condensate from said fluid may be observed in said chamber, and a small passage whereby liquid drains from said chamber into said receptacle.

4. A device for indicating the thermal conditions in a receptacle holding liquid, said device comprising a chamber positioned outside of the receptacle, a relatively large passage extending from the receptacle and arranged to discharge fluid into said chamber from above, transparent means through which condensate from said fluid may be observed in said chamber, a baffle in said passage above said chamber, and a small passage whereby liquid drains from said chamber into said receptacle.

5. A device of the kind described adapted to be mounted on an automobile radiator, said device comprising a housing having a plurality of chambers therein, one of said chambers being positioned above the other and being arranged to drain into the lower chamber, a passage whereby fluid may flow from said radiator into said upper chamber, a small passage whereby fluid may drain from said lower chamber into said radiator, and transparent means through which condensate in said lower chamber may be observed.

6. A device of the kind described adapted to be mounted on an automobile radiator, said device comprising a housing having a plurality of chambers therein, one of said chambers being positioned above the other and being arranged to drain into the lower chamber, a plurality of baffles in the upper chamber, a passage whereby fluid may flow from said radiator into said upper chamber, a small passage whereby fluid may drain from said lower chamber into said radiator, and transparent means through which condensate in said lower chamber may be observed.

7. A device of the kind described adapted to be mounted on an automobile radiator, said device comprising a housing having a chamber therein, oppositely disposed disks of glass forming two walls of said chamber, a second chamber formed in said housing member and disposed above the first-mentioned chamber, said second chamber being adapted to drain into the first-mentioned chamber, a passage in said housing whereby fluid may flow from said radiator into said upper chamber, and a relatively small passage whereby fluid may flow from said lower chamber into said radiator.

8. A device of the kind described adapted to be mounted on an automobile radiator, said device comprising a housing having a plurality of chambers therein, one of said chambers being positioned above the other and being arranged to drain into the lower chamber, a vent whereby said second chamber communicates directly with the atmosphere, a small passage whereby fluid may drain from said lower chamber into said radiator, and transparent means through which condensate in said lower chamber may be observed.

In testimony whereof, I have hereunto signed my name.

JOHN W. ANDERSON.